United States Patent [19]

Jones

[11] 4,391,554

[45] Jul. 5, 1983

[54] MOORING SYSTEM BEARING FOR A TENSIONED LEG PLATFORM

[75] Inventor: Darrell L. Jones, Ventura, Calif.

[73] Assignee: Vetco Offshore, Inc., Ventura, Calif.

[21] Appl. No.: 266,023

[22] PCT Filed: Aug. 22, 1980

[86] PCT No.: PCT/US80/01025

§ 371 Date: Aug. 22, 1980

§ 102(e) Date: Aug. 22, 1980

[87] PCT Pub. No.: WO82/00621

PCT Pub. Date: Mar. 4, 1982

[51] Int. Cl.³ .............................................. B63B 21/50
[52] U.S. Cl. ................................ 405/224; 114/293; 405/195; 403/133
[58] Field of Search ............... 114/230, 264, 265, 267, 114/293; 441/3–5; 405/195, 196, 224, 226; 403/132, 133; 285/267, 223, 235

[56] References Cited

U.S. PATENT DOCUMENTS

| 4,062,313 | 12/1977 | Stram | 114/265 |
| 4,064,822 | 12/1977 | Thornburg | 114/264 |
| 4,098,527 | 7/1978 | Herbert | 403/133 |
| 4,130,995 | 12/1978 | Osborne | 405/224 |
| 4,169,424 | 10/1979 | Newby | 114/265 |
| 4,320,993 | 3/1982 | Hunter | 405/224 |

FOREIGN PATENT DOCUMENTS 2840881 4/1980 Fed. Rep. of Germany ...... 405/224

Primary Examiner—Trygve M. Blix
Assistant Examiner—Thomas J. Brahan
Attorney, Agent, or Firm—Edward L. Kochey, Jr.

[57] ABSTRACT

A mooring system bearing apparatus (28) has a flexible connector (16). The body (32) is connected to a bearing sleeve (52) thru elastomeric bearings 40,42. Stops 44,60 46,62 limit strain of the elastomeric bearings.

10 Claims, 3 Drawing Figures

MOORING SYSTEM BEARING FOR A TENSIONED LEG PLATFORM

BACKGROUND OF THE INVENTION

This invention relates to mooring systems for tensioned leg platforms and in particular to a bearing located within a mooring tunnel to absorb tension leg strains.

After an offshore well is drilled from a floating platform, it may be desirable to produce the well to a later-installed tensioned leg platform. These tensioned leg platforms, while supported by the buoyancy of the water, are not freely floating but are tied back to a plurality of anchors on the seabed.

An anchor template is affixed to the seabed, and an anchor connector with a flexible element connects the lower end of a tension line to an anchor template. The tension line which is formed of a length of heavy wall tubular elements connected by threaded joints is connected to an upper flexible element located within the lower hull structure of the tensioned leg platform. A tension load base block which carries the reaction loads between the tension line and the structural framing of the platform is located above the water level, and a tension adjustment assembly is located at the support elevation, with means for sensing the load also included.

A lower spherical flex element is required at the anchor connector. An upper spherical flex element is also located at the tensioned leg platform. These permit the platform to translate horizontally due to the forces of wind, waves, and current. These flexible elements allow the tension leg to deflect locally at the anchor template and at the lower surface of the platform hull. In theory, the length of the tension leg is held constant by the threaded nut in the tension adjustment and support assembly. However, large ocean swells cause the waterline to move vertically relative to the platform as it is anchored by the tension line, thus changing the displacement and in turn the net buoyant force of the platform. This change in buoyant force causes a variation in tension. For instance with a nominal tension of 1,000 tons, the cyclic variation due to waves in a 100-year storm causes the tension to vary in the range of plus and minus 400 tons.

This variation in tension causes a resultant variation in the strain of the tension line. As the strain varies in the tension line, the upper flexible element is forced to move vertically relative to the tensioned leg platform structure as a function of the strain variation or stretch in the portion of the tension leg between the support location on the platform and the flexible element. This distance is in the order of 100 feet, and the movement is typically in the order of 1½ inches.

This relative vertical motion is concurrent with large horizontal offsets of the platform relative to the anchor template which causes the tension line to assume an angle relative to the vertical. The horizontal component of the tension in the line is then reacted as a side load against the lower hull structure, or mooring tunnel, of the platform through the upper flexible element. Side loads due to this may be as great as 100 tons. Thus, the upper flexible element is forced to oscillate vertically relative to the platform as it is simultaneously loaded horizontally against the interior wall of the platform mooring tunnel. This creates an extremely high wear situation at this location where components are extremely difficult to replace.

SUMMARY OF THE INVENTION

The upper universal flexible connector located within the mooring tunnel has an external body which is rigidly connected to the upper portion of the tension leg. It also has an internal body rigidly connected to the lower portion of the tension leg, and the connector conducts axial forces through the connector while permitting pivotal movement of the lower leg around the connector. At least one cylindrical elastomeric bearing has a first side attached to the external body. An elongated bearing sleeve surrounds the external body and is attached to a second side of the elastomeric bearing, with the sleeve being sized and shaped to conform to the inside of the mooring tunnel. Preferably two elastomeric bearings are axially spaced from one another, and the bearings have significantly more resilience in the axial direction than in the radial direction. Stops are located to avoid excessive strains in the axial bearing.

When the platform is offset and the tension line assumes an angle relative to vertical, the horizontal component of the load causes considerable friction between the bearing sleeve and the mooring tunnel. Movement of the sleeve is thereby resisted while the elastomeric bearing absorbs differential movement, thereby avoiding friction forces concurrent with the high horizontal loading. When there is no offset, it follows that there is low horizontal force. Movement at this time permits the bearing surface to slide within the mooring tunnel because of the low resistance to sliding. However, wear is minimal since this motion is not concurrent with high horizontal forces.

DESCRIPTION OF THE PREFERRED EMBODIMENT

Figure 1:
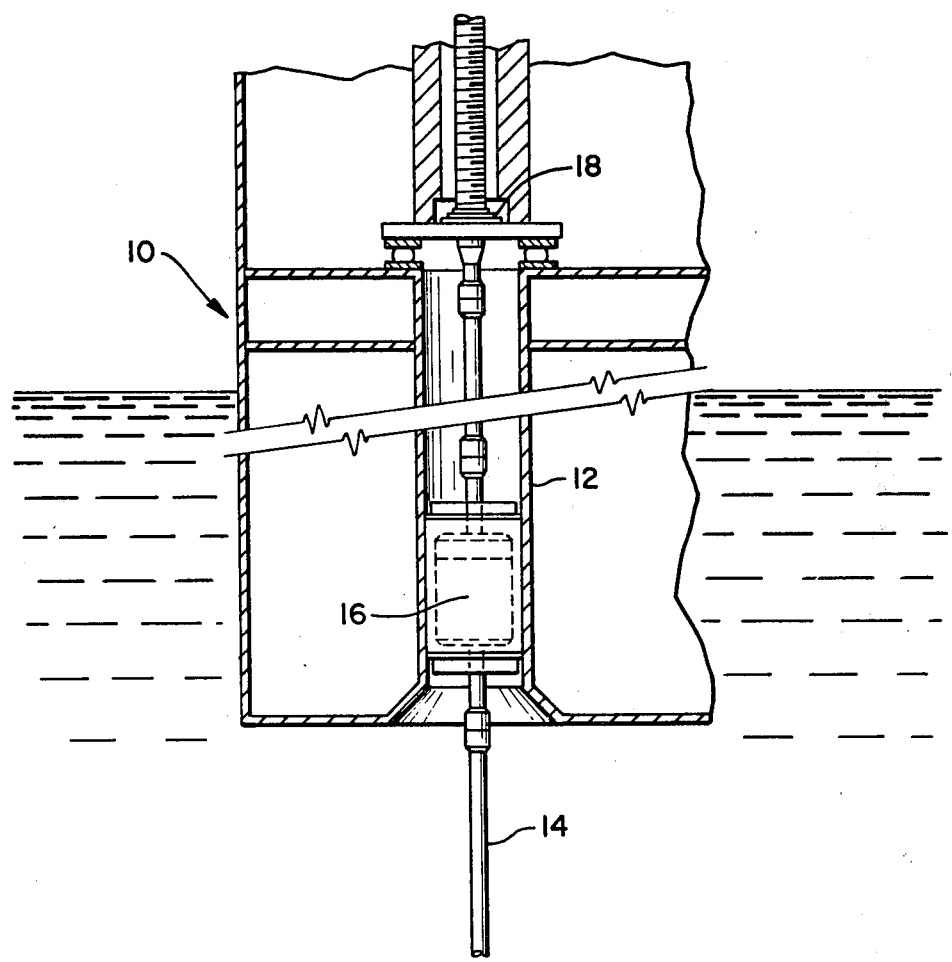
FIG. 1 illustrates the general arrangement of a platform, an anchor, and a tension leg.
Figure 1:
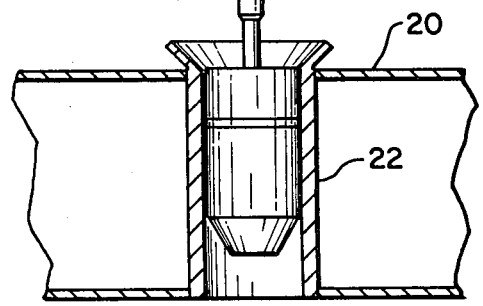
Figure 2:
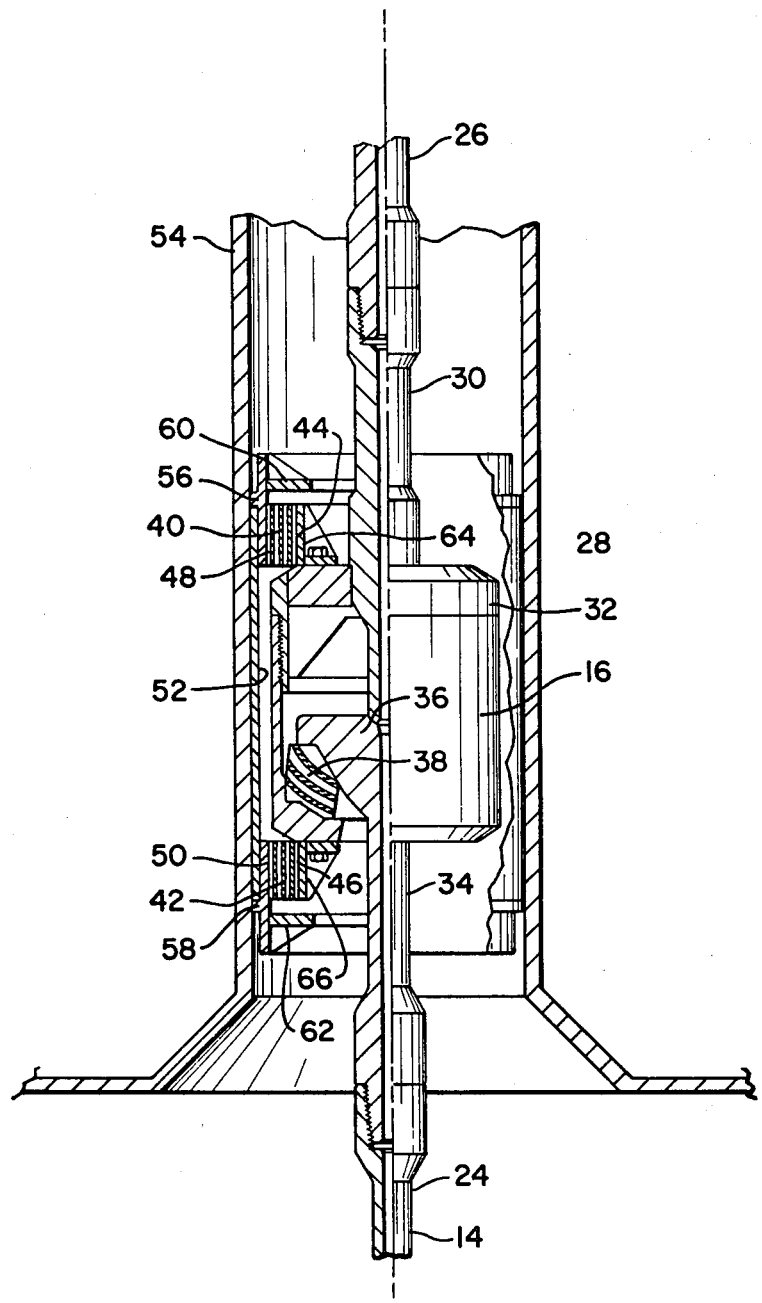
FIG. 2 is a detail of the bearing located within the mooring tunnel.

A platform 10 includes a mooring tunnel 12 through which passes the tension leg 14. This tension leg includes an upper flexible connector 16, and the leg is supported above the waterline by a locking collar 18. An anchor template 20 is secured to the seabed through driven, drilled, and cemented pilings. The template includes a hollow cylindrical anchor tube 22 which forms a cylindrical opening through the template 20. The tension leg 14 includes a lower tension leg 24 which is connected to the anchor and an upper tension leg 26 which is connected to the platform support elevation. The mooring system bearing apparatus 28 includes an upper tension leg connecting means 30 which has an external flexible connector body 32 rigidly connected thereto. A lower tension leg connecting means 34 has an internal body 36 rigidly connected thereto. The universal flexible connector 16 includes a spherical elastomeric bearing 38 which permits the connector to conduct axial forces through the tension legs while it permits pivotal motion of the lower tension leg 24 around the connector.

An upper cylindrical elastomeric bearing 50 and a lower elastomeric cylindrical bearing 42 each are of cylindrical shape and consist of concentric metallic shims bonded to intermediate regions of elastomeric material. This arrangement provides for a high spring rate or low resilience in the radial direction of the bearing while it allows for a relatively small spring rate or high resilience in the axial direction. A first side 42 and 46, respectively, of each of the elastomeric bearings is secured to the external body 32. The second side 48 and 50, respectively, of each elastomeric bearing is attached to an elongated bearing sleeve 52 which surrounds the external body 32.

The bearing sleeve 52 is sized and shaped to conform to the inside of the mooring tunnel 54 and is free to slide therewithin. The connection between the elastomeric bearings and the bearing sleeve is conveniently made with support rings 56 and 58 which forces the bearings 40 and 42 to operate together. Each of these includes a stop portion 60 and 62, respectively. The external body 32 employs rings 64 and 66 which not only connect to the bearings but also operate as stop members in conjunction with elements 60 and 62, respectively, with which they interact.

Figure 3:
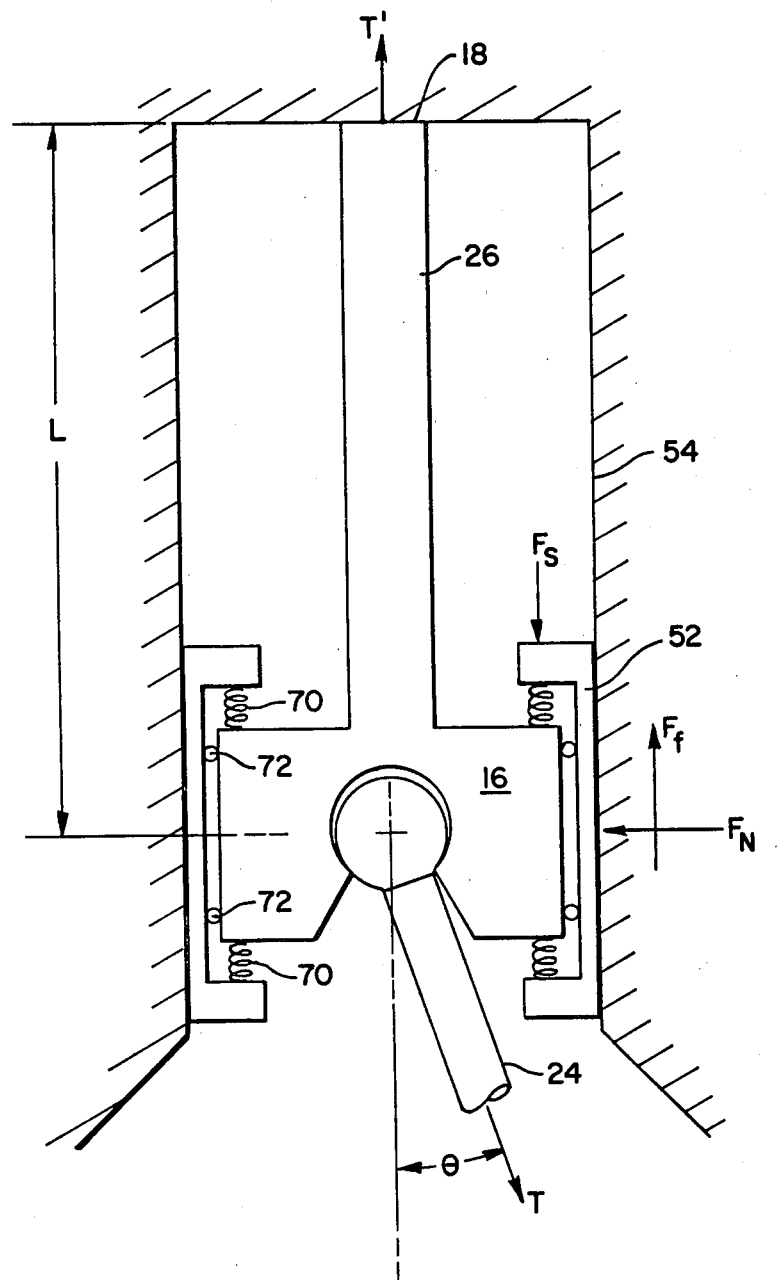
FIG. 3 is a schematic drawing illustrating the forces acting on the bearing sleeve.

Referring now to FIG. 3, the upper tension leg 26 is supported at support 18 with the universal flexible connector 16 being located at a length L below the support. The upper leg 26 expands from its unloaded condition as a function of its length L, its modulus of elasticity, and its cross-sectional area. Initial tensioning of the legs results in an elongation to a length $L_o$ which is an assumed starting point for the purposes of this discussion. It is also assumed at this time that the bearing sleeve 52 floats with the connector 16 to this initial $L_o$ condition.

If it is now assumed that the lower leg 24 assumes an angle $\theta$ with the same initial vertical loading T' and a corresponding slight increase in T from the original vertical condition, there is no vertical movement of the connector 16; but the horizontal component of T places a force $F_n$ in the amount of T$\theta$. With this force operating between the side of the bearing sleeve 52 and the mooring tunnel 54, the bearing can resist a maximum vertical force of $C_fT \sin \theta$, where $C_f$ is the coefficient of friction.

If the loading T now varies at angle $\theta$, there is a related variation in T' through the upper leg 26. This causes the change in the strain of this leg and a movement of a flexible connector 16. The elastomeric bearings 40 and 42 are represented in this illustration by springs 70 and rollers 72 which represent the soft or resilient action in the vertical direction and the relatively stiff action in the horizontal direction. Movement of the connector 16 from its initial position causes a deflection of the elastomeric bearing 70 and depending on the spring constant establishes a force $F_s$ which is imposed on the bearing sleeve 52. So long as this force $F_s$ is less than the maximum allowable friction $F_f$, there will be no relative movement between the bearing 52 and the mooring tunnel 54. The elastomeric bearings should be soft in the vertical direction to permit maximum movement without sliding of the bearing surface. The bearings should be stiff in the other direction primarily because this type construction permits a bearing which will not buckle and extrude under high side loadings.

For an understanding of the operation of this bearing, it will be discussed first with essentially vertical loads, secondly with a variation in load at a given offset angle $\theta$, and thirdly with the effect of varying offsets. In the vertical direction there is essentially a zero force $F_n$; and, accordingly, there is no resistance $F_f$ to friction. In such a situation the bearing sleeve 52 is free to move up and down with the flexible connector 16. In this situation, however, there is only nominal wear between the bearing and the mooring tunnel 54 since there is no side or force on the rubbing surface.

If it is now assumed that the bearing system is operating at an angle $\theta$ and that the bearing sleeve 52 is in its initial position, the resistance to sliding of the bearing sleeve is a function of the stiffness and length of upper leg 26, the stiffness or spring rate of the sum total of the elastomeric bearings, and the coefficient of friction between the bearing sleeve 52 and the mooring tunnel 54. A force $F_n$ and a corresponding maximum friction resistance $F_f$ is established with the initial tension. During the fluctuating load cycle, the tension T is increased to a maximum value above the initial force and to a minimum value which still represents a positive tension T but which is lower than the initial value. The horizontal force $F_n$ varies correspondingly from a maximum to minimum value as does the maximum friction resistance $F_f$.

At the same time the elongation of the upper leg 26 varies with the tension; and, accordingly, the flexible connector 16 moves. Operating through the elastomeric bearing, this movement places a varying force $F_s$ on the bearing sleeve. This is a function of the resultant tension T'. It can be seen and mathematically developed that there is more resistance to sliding of the bearing with the increased load T than with the decreased load T. So long as the load cycles are within these allowable limits, there would be no movement of the bearing sleeve 52. Should it cycle so that one of the limits is exceeded, the sleeve will move to a new neutral position; and so long as the load range is within the calculated value, there will be no additional movement of the sleeve on succeeding cycles.

For any given angle the required spring constant can be calculated based on the above-described considerations. Additional refinement may be made by considering the effect of the spring constant on the transmittal of load between the lower tension leg 24 and the upper tension leg 26.

If it is now assumed that at varying angles $\theta$ there is a given fluctuation in the vertical load, it can be seen that with $\theta$ equal to zero there is no restraint on the vertical movement. If on the other hand the angle is in the order of 10 to 15 degrees, there is a high resistance to friction due to the initial tensioning of the leg. Fluctuations in the load increase this friction with an increased load and decrease it with a decreased load. However, because of the high value of the initial load, there would be no moving of the sliding bearing at the high offsets (assuming a proper stiffness rate at the spring). As the angle $\theta$ increases from zero toward the maximum moment, there is sliding of the bearing sleeve through a portion of the travel. With the small angle there is a relatively small resistance to the sliding friction; and, accordingly, it is only when the spring rate force exceeds the friction force that the bearing moves. In this situation there is some sliding of the bearing surface but only through a portion of the travel. This, however, is at those conditions where there is a small side load on the bearing and, consequently, a relatively small amount of wear in the face of friction.

While for the purposes of discussion it was assumed that the bearing sleeve was always in its neutral position, it can be seen that regardless of what the initial position is at any time, once the resistance to sliding friction is exceeded, the bearing will be moved to its neutral position and repeated cycles will be taken through the flexing of the elastomeric bearings rather than the sliding within the mooring tunnel. Furthermre, in order to protect the elastomeric bearing from failure in the event f excess strain, stops 60, 62, nd 64, nd 66 operate to limit the strain. Under such an extreme condition, the excess strain is absorbed by movement of the sliding bearing sleeve within the mooring tunnel.

The two elastomeric bearings 40 and 42 are axially spaced. They, therefore, operate effectively to resist bending of the external flexible connector body 32 as the flexible connector absorbs the angular movement. A more uniform distribution of horizontal loads thru the elastomeric bearing is accomplished if the pivot point can be placed at an elevation between the two bearings.

It can be seen that a mooring system bearing for a tensioned leg platform has been provided which avoids wear under the high wear conditions existing with a high horizontal loading, and yet which permits sliding movement and movement to a neutral position under other conditions.

I claim:

1. A mooring system bearing apparatus for a tensioned leg platform having a vertical mooring tunnel through which the tension leg passes comprising: an upper tension leg connecting means; a lower tension leg connecting means; a universal flexible connector having an external body rigidly connected to said upper connector means, an internal body rigidly connected to said lower connector means, and means for conducting axial forces along the tension leg through the connector while permitting pivotal motion of the lower tension leg around the connector; at least one cylindrical elastomeric bearing having a first side attached to said external body; an elongated bearing sleeve surrounding said external body and attached to a second side of said elastomeric bearing, said sleeve sized and shaped to conform to the inside of said mooring tunnel.

2. An apparatus as in claim 1 having two axially-spaced elastomeric bearings, whereby resistance to bending of said upper connector body is increased.

3. An apparatus as in claim 2 wherein one of said elastomeric bearings is located above the pivot point of said flexible connector and the other of said bearings is connected below the pivot point of said flexible connector.

4. An apparatus as in any one of claims 1, 2, or 3 wherein said elastomeric bearings are significantly more resilient in the axial direction than in the radial direction.

5. An apparatus as in claim 4 wherein said bearing sleeve is cylindrical.

6. An apparatus as in claim 4 having also rigid interacting stops on said bearing sleeve and said upper connecting means whereby the axial resilient motion of said elastomeric bearing is limited.

7. A mooring arrangement for a tensioned leg platform having a vertical mooring tunnel therethrough comprising: an upper tension leg passing through said tunnel; means for supporting and tensioning said tension leg from the platform at an upper elevation; a lower tension leg; means for securing said lower tension leg to the seabed; a pivotally flexible connector, connecting said upper and lower tension legs, and located in said mooring tunnel, an upper body of said connector rigidly secured to said upper tension leg, and a lower body of said connector rigidly connected to said lower tension leg; a bearing sleeve sized to slidably fit within said mooring tunnel; and at least one cylindrical elastomeric bearing having one side affixed to said upper body and the other side affixed to said bearing sleeve. ical elastomeric bearing having one side affixed to said upper body and the other side affixed to said bearing sleeve.

8. An apparatus as in claim 7 having two axially-spaced elastomeric bearings, whereby resistance to bending of said upper connector body is increased.

9. An apparatus as in one of claims 7 or 8 wherein said elastomeric bearings are significantly more resilient in the axial direction than in the radial direction.

10. An apparatus as in claim 9 having also rigid interacting stops on said bearing sleeve and said upper connecting means whereby the axial resilient motion of said elastomeric bearing is limited.

* * * * *

UNITED STATES PATENT AND TRADEMARK OFFICE
CERTIFICATE OF CORRECTION

PATENT NO. : 4,391,554
DATED : July 5, 1983
INVENTOR(S) : Darrell L. Jones

It is certified that error appears in the above—identified patent and that said Letters Patent is hereby corrected as shown below:

Column 2, line 67, change "50" to --40--.

Column 4, line 54, change "at" to --of--.

Column 5, line 5, change "Furthermre" to "Furthermore"

Column 5, line 7, change the two occurrences of "nd" to --and--.

Column 5, line 7, change "f" to --of--.

Column 6, lines 30 through 33, delete the sentence starting with "ical" and ending with "sleeve."

Signed and Sealed this

Seventeenth Day of April 1984

[SEAL]

Attest:

GERALD J. MOSSINGHOFF

Attesting Officer — Commissioner of Patents and Trademarks